July 18, 1950     E. M. McELLIGOTT     2,516,065
PROCESS OF PRODUCING PEARLESCENT ARTICLES
Filed June 23, 1948
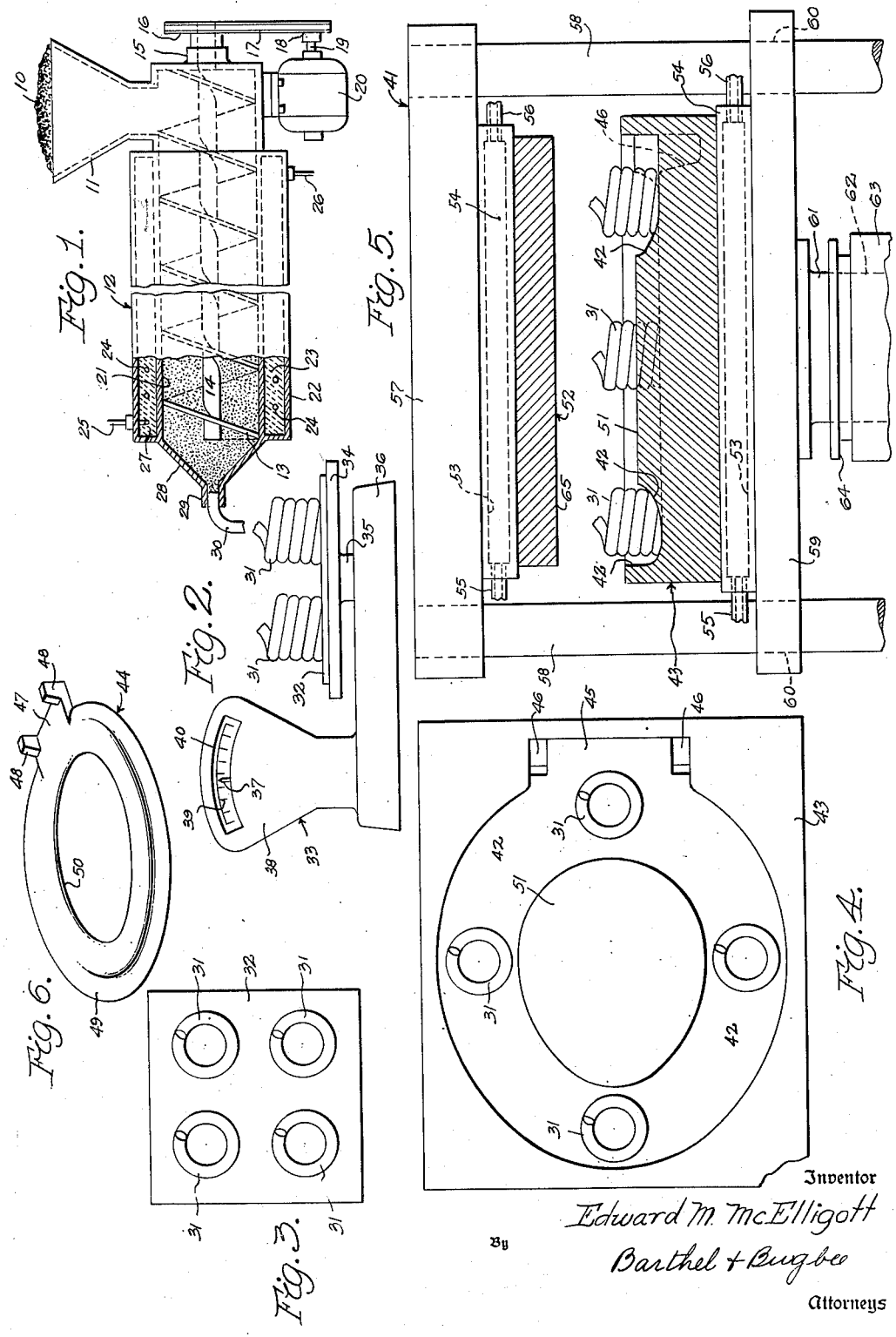
Inventor
Edward M. McElligott
By Barthel & Bugbee
Attorneys Patented July 18, 1950

2,516,065

UNITED STATES PATENT OFFICE 2,516,065

PROCESS OF PRODUCING PEARLESCENT ARTICLES

Edward M. McElligott, Detroit, Mich., assignor to Swedish Crucible Steel Company, Detroit, Mich., a corporation of Michigan Application June 23, 1948, Serial No. 34,644

3 Claims. (Cl. 18—48.8)

This invention relates to molding and in particular to processes of molding plastic articles.

One object of this invention is to provide an improved process of molding pearlescent plastic articles wherein the articles will have a pearlescent appearance yet are not inflammable and are not subject to peeling off of the outer layers of the material.

Another object is to provide a process of making pearlescent plastic articles wherein the pearlescent material extends entirely through the article and is not a mere surface layer, as in prior pearlescent articles.

Another object is to provide a process of molding pearlescent plastic articles wherein the various steps in the process are free from the hazards to life and health of noxious inflammable or explosive vapors present in prior processes.

Another object is to provide a process of molding pearlescent plastic articles wherein the article is molded in a solid integral unit at a single molding step without the need for applying pearlescent sheet material to cores or forms, as in prior processes.

Another object is to provide a process of molding pearlescent plastic articles wherein the pearlescent appearance is formed by the interaction between mixtures of dissimilar plastics but wherein the dissimilar plastics are molded together in such a manner as to prevent the delamination or peeling apart which has characterized previous attempts in producing solid articles made from such dissimilar plastics.

Another object is to provide a process of producing pearlescent plastic articles which are impervious to acids and ordinary chemicals commonly encountered in a household, which are also fire-resisting, and which are easily cleaned and maintained in a sanitary condition, the process being particularly well-adapted to the production of toilet seats and covers therefor.

In the drawings:

Figure 1 is a diagrammatic side elevation, partly in vertical section, of an extrusion machine employed in the first step of the molding process of the present invention;

Figure 2 is a diagrammatic side elevation of charges of hot plastic material in position on a weighing scale immediately after extrusion from the extrusion machine of Figure 1;

Figure 3 is a top plan view of the supporting plate of Figure 2 with the charges or hot plastic material in position thereon ready for transfer to a molding press;

Figure 4 is a top plan view of the lower half of a mold set showing the charges of hot plastic material properly distributed in the cavity thereof;

Figure 5 is a diagrammatic fragmentary side elevation, partly in vertical section, showing the charges of hot plastic material positioned in the mold cavity of Figure 4, immediately prior to the commencement of the molding stroke; and Figure 6 is a reduced-size perspective view of a pearlescent toilet seat molded according to the process illustrated in Figures 1 to 5 inclusive.

Hitherto, the production of articles having a pearlescent appearance has been attended with great difficulty, and the resulting product has frequently possessed grave defects. In the case of pearlescent toilet seats, these defects have resulted in hazards both during manufacture and use, with occasional accidents resulting from the hazards. In prior processes of producing pearlescent articles, such as toilet seats, a sheet of the pearlescent material has been applied to a core by stretching the sheet of the pearlescent material over the cover, which has been previously coated with a suitable cement. Heat and pressure are then applied in order to seal the edges of the sheets together at the rim of the core. The edges of the sheets are then trimmed off to remove surplus material. The sheet material is applied to the core immediately after its removal from a solvent bath, such as acetone, thereby filling the surrounding air with noxious vapors and requiring extensive and efficient ventilation to prevent danger to the health of the workers.

Such prior processes also require the enforcement of stringent fire precautions because of the inflammable nature of the materials employed. The sheet material used in prior processes is ordinarily nitro-cellulose, which is highly inflammable, hence the material itself involves a fire hazard as well as the solvents employed in its use. The prior pearlescent articles, such as toilet seats, produced by these prior processes have also been unsatisfactory in many ways. The core, being ordinarily of wood or molded cellulose, has been subject to warping, cracking, and decaying, as well as absorbing liquids. The sheet material cemented to the core is subject to peeling at the edge, thereby permitting water and odorous liquids to enter and be absorbed by the core, and germs to lodge in the crevices thereby provided. If a match or cigarette is accidentally laid upon the prior seat or cover, it is likely to ignite the highly inflammable nitro-cellulose outer layer, causing it to flash into flame. The pungent fumes resulting from the burning of the prior nitro-cellulose materials are also deadly if breathed into the lungs.

The process of the present invention avoids all of these disadvantages of prior pearlescent articles by molding the articles from a mixed batch of dissimilar non-inflammable plastics, the interaction of which produces a pearlescent effect, which not only closely resembles mother-of-pearl, but which also has strikingly beautiful color patterns of its own. At the same time, the present process avoids peeling and delamination defects which are commonly present when such dissimilar plastics have been previously mixed.

Referring to the drawings in detail, Figures 1 to 5 inclusive show the various stages in the process of molding pearlescent plastic articles according to the present invention. The batch of dissimilar synthetic plastic materials used in this process has approximately the following proportions:

| | Per cent |
|---|---|
| Methyl methacrylate resin, clear | 60 |
| Polystyrene resin, clear | 35 |
| Polystyrene resin, colored | 5 |
| | 100 |

The colored plastic may be of any shade or hue, according to the effect desired. The materials, in granulated form of approximately the size of rock salt or ice cream salt, are weighed out and mixed thoroughly in a dry condition in a conical tumbler or any other suitable mixer.

The batch 10 of dry granulated material, thus mixed, is placed in the hopper 11 of an extruding machine generally designated 12 (Figure 1) through which it is forced to travel by means of a screw 13 mounted on a shaft 14 which is journaled in a bearing 15 at its rearward end. The screw shaft 14, for the sake of simplicity, is shown as carrying a pulley or sprocket 16 which is driven through a belt or sprocket chain 17 from a similar pulley or sprocket 18 mounted upon the armature shaft 19 of a motor 20. In actual practice, of course, the screw shaft 14 is rotated much more slowly than the indicated arrangement would provide, hence speed reduction gearing is ordinarily employed between the motor 20 and the shaft 14. The screw shaft 14 is also ordinarily supported at its forward end by a streamlined spider or cross member containing a bearing, but this has also been omitted for simplicity of showing.

The screw 13 revolves in a cylindrical bore 21 within a hollow jacketed cylinder 22 containing an annular chamber 23 encircled by a heating coil 24. The heating coil 24 may be of any suitable type, such as an electrical resistance winding or a steam pipe. For convenience, the coil 24 has been shown as electrical with leads 25 and 26 connected to an external source of electric current. The coil 24 is supported in a layer of insulating material 27 such as asbestos or mica, so as to prevent contact between it and the hollow cylinder 22 and at the same time sustain the heat produced by the coil 24. The bore 21 at its forward end is provided with a conical nose portion 28 terminating in a nozzle 29 from which the material 10 is extruded in a rope-like thread 30.

While the material is in the hopper 11, the heat coming up from the machine 12 preheats the granular material 10 and drives off any moisture which it may possess. As the screw 13 revolves, the heating coil 24 is constructed and operated in such a manner as to maintain the temperature within the cylinder bore 21 at approximately 400° to 500° Fahrenheit so that the granulated material is melted and mixed together as the screw 13 rotates and forces it through the cylinder bore 21. The material extruded in the cord or thread 30 is preferably at the temperature of about 450° Fahrenheit. The operator causes the extruded material to accumulate or pile up in blobs, lumps, piles or coils forming charges 31 upon a receiving plate 32 (Figures 2 and 3), assisting the coiling process with his hands.

When a charge of sufficient size has been built up in this manner, according to experience and the size of the article to be molded, the operator snips the thread 30 by scissors or the like and moves the plate 32 to a new location to deposit another charge 31 thereon. In this manner, a number of charges 31 are deposited on the plate 32, the total amount being measured accurately by means of weighing scales 33 having a platform 34 for receiving the plate 32. The platform 34 is mounted on the usual plunger 35 movably supported on a base 36 and connected by suitable conventional mechanism to a pointer 37 which swings to and fro in a housing 38 and indicates the weight of the articles on the platform by means of a graduated scale 39 viewed through an arcuate window 40. The weighing scale 33 is conventional, its details forming no part of the present invention, and any suitable weighing apparatus may be used in its stead.

When a predetermined quantity of the plastic molding material has been weighed out on the plate 32, the cord 30 is severed. The total weight of the charges 32 is maintained at a constant predetermined amount which in order that there shall be the minimum of "flash" or excess material in the mold, is obviously substantially equal to the weight of the final article to be molded. The plate 32 with the hot charges of material 31 still in position is rapidly transferred to the vicinity of a molding press, generally designated 41, where the charges 31 are removed and placed at spaced locations around the periphery of the mold cavity 42 in the lower mold half 43. The size and shape of the mold cavity 32, of course, varies according to the size and shape of the article to be produced. For the toilet seat, generally designated 44, to be produced by the process of the present invention (Figure 6), the mold cavity 42 is annular and at one end is provided with an offset portion 45 having downwardly-extending recesses 46 which form the platform 47 and hinge posts 48 of the toilet seat 44. The seat portion 49 is of course annular with an opening 50 in the center thereof and this is produced by an island 51 rising in the center of the mold cavity 42.

Cooperating with the mold half 43 is an upper mold half 52 which is of such a size as to enter the mold cavity 42 and its offset portion 45 snugly and accurately. The lower and upper mold halves 52 are preferably heated, as by heating chambers 53 in casings or hollow base portions 54 supplied with steam or other heating agents through inlet and outlet conduits 55 and 56 respectively (Figure 5). The upper mold half 52 and its base 54 are mounted upon the head 57 of the press 41 which is connected by the usual strain rods 58 to a press bed (not shown). Reciprocably mounted upon the strain rods 58 or upon guides (not shown) is a platen 59 having apertures 60 for the passage of the strain rods 58. Connected to the lower side of the platen 59 is a plunger 61 which is reciprocable in the cylinder bore 62 of a hydraulic cylinder 63 mounted upon the press bed (not shown). The leakage from around the plunger 61 is prevented by means of the usual gland 64 which compresses an annular packing (not shown).

When the charges 31 have been appropriately positioned within the mold cavity 52, the operator starts the molding press so as to cause the platen 59 to rise and bring the mold halves 43 and 52 into telescoping engagement with one another. As the mold half 52 enters the mold cavity 42, it compresses the charges 31 and causes them to spread out so as to fill the mold cavity and to approach one another. In order to maintain the charges 31 in a plastic condition, the mold halves are maintained at a temperature of approximately 325° to 350° Fahrenheit. The mold halves 52 and 43 are forced together by an unusually heavy pressure of approximately 3000 to 4000 pounds per square inch, this being accomplished by a molding pressure in the neighborhood of 250 tons.

When the mold halves 52 and 43 reach their point of nearest approach, they are permitted to stand for approximately 3 or 4 minutes in order to force the "flash" or excess material out of the mold. The flash emerges in the form of a paper thin film or ribbon because the mold clearances are maintained within very close limits. Since the total weight of the material in the blobs 31 is kept almost exactly at a predetermined figure by the use of the weighing scale 33, there is very little flash produced. After the mold halves have stood in this manner for 3 or 4 minutes, cooling water at approximately 80° is passed through the chambers 53, cooling down the mold halves 52 and 43 and their contents. The operator then reverses the press mechanism to cause the mold halves 43 and 52 to separate, whereupon the molded article 44 is exposed and may now be removed from the mold cavity 42.

The molded article 44, when removed from the mold cavity, is found to be continuous in extent, without cracks and with a variegated coloration and marking resembling mother-of-pearl. The heavy pressure employed in molding, together with the minimization of the travel of the material of the blobs 31 in filling the mold cavity 42, results in a solid plastic article which is not subsequently subject to delamination or peeling apart. It is free from cracks, pits, and other blemishes. It is found, however, that great care and cleanliness is required in carrying out the molding process so that no foreign matter enters either the material or the mold cavity. After each molding operation, the operator carefully cleans both the mold cavity 42 and the face 65 of the upper mold half 52 in order that no trace of molding material remains therein or thereon. The foregoing procedure is then repeated in order to produce the next article 44, the procedure being repeated indefinitely to produce the desired number of articles.

What I claim is:

1. A process of molding pearlescent plastic articles, comprising intermingling comminuted methyl-methacrylate resin with comminuted polystyrene resin to form a comminuted batch, applying heat to said bath to plasticize the components thereof, mixing together the resins in the heated batch, weighing out a multiplicity of individual charges of the batch so mixed, the weights of the said individual charges being so selected that the sum total thereof is substantially equal to the weight of the final article to be molded, placing said individual charges of the mixed plasticized batch at spaced locations within a mold cavity whereby to minimize the travel of the batch during the subsequent molding operation, applying pressure to said charges to spread the batch throughout the mold cavity and cooling the batch to harden it in the shape imparted thereto by the mold cavity.

2. A process of molding pearlescent plastic articles, comprising intermingling comminuted methyl-methacrylate resin with comminuted polystyrene resin to form a comminuted batch, applying heat to said batch to plasticize the components thereof, mixing together the resins in the heated batch, extruding the mixed batch through an aperture into a multiplicity of individual charges of predetermined weight, the weights of the said individual charges being so selected that the sum total thereof is substantially equal to the weight of the final article to be molded, placing said individual charges of the mixed plasticized batch at spaced locations within a mold cavity whereby to minimize the travel of the batch during the subsequent molding operation, applying pressure to said individual charges to spread the batch throughout the mold cavity and cooling the batch to harden it in the shape imparted thereto by the mold cavity.

3. A process of molding pearlescent plastic articles, comprising intermingling comminuted methyl-methacrylate resin with comminuted polystyrene resin to form a comminuted batch, applying heat to said batch to plasticize the components thereof, mixing together the resins in the heated batch, extruding the mixed batch through an aperture into a stream, depositing the stream upon a support, weighing the deposited stream to deposit a charge of a predetermined weight upon said support, severing the stream upon the attainment of said predetermined weight, the weights of the said individual charges being so selected that the sum total thereof is substantially equal to the weight of the final article to be molded, placing said individual charges of the mixed plasticized batch at spaced locations within a mold cavity whereby to minimize the travel of the batch during the subsequent molding operation, applying pressure to said individual charges to spread the batch throughout the mold cavity and cooling the batch to harden it in the shape imparted thereto by the mold cavity.

EDWARD M. McELLIGOTT.

REFERENCES CITED

The following references are of record in the file of this patent:

UNITED STATES PATENTS

| Number | Name | Date |
| --- | --- | --- |
| 1,593,525 | Copeland | July 20, 1928 |
| 1,944,464 | Richardson | Jan. 23, 1934 |
| 2,302,918 | Smith | Nov. 24, 1942 |
| 2,353,457 | Goessling | July 11, 1944 |

OTHER REFERENCES

Ellis, "The Chemistry of Synthetic Resins," Reinhold Pub. Corp., New York, 1935, vol. 2, pp. 1317–1321.